United States Patent [19]

Bleakley et al.

[11] Patent Number: 5,558,782
[45] Date of Patent: Sep. 24, 1996

[54] RECOVERY OF WATER AND SOLIDS IN A PAPER MILL

[75] Inventors: Ian S. Bleakley; Hannu O. E. Toivonen, both of St. Austell, United Kingdom

[73] Assignee: ECC International Limited, United Kingdom

[21] Appl. No.: 355,038

[22] Filed: Dec. 13, 1994

Related U.S. Application Data

[63] Continuation-in-part of Ser. No. 171,018, Dec. 21, 1993.

[51] Int. Cl.$^6$ .................................................... C02F 1/52
[52] U.S. Cl. ..................... 210/712; 162/29; 162/189; 162/190; 210/716; 210/717; 210/726; 210/737; 210/928
[58] Field of Search ........................... 162/29, 189, 190; 210/702, 710, 711, 712, 716, 717, 724, 726, 737, 917, 928

[56] References Cited

U.S. PATENT DOCUMENTS

| | | | |
|---|---|---|---|
| 2,470,577 | 5/1949 | Roderick et al. | 106/306 |
| 3,152,001 | 10/1964 | Podschus et al. | 106/306 |
| 3,262,877 | 7/1966 | Le Compte | 210/712 |
| 3,639,206 | 2/1972 | Spruill | 162/29 |
| 3,736,254 | 5/1973 | Croom | 210/928 |
| 3,833,463 | 9/1974 | Croom | 162/189 |
| 5,082,887 | 1/1992 | Brown et al. | 524/413 |
| 5,262,006 | 11/1993 | Anderson et al. | 162/189 |

FOREIGN PATENT DOCUMENTS

| | | |
|---|---|---|
| 2265916A | 7/1993 | United Kingdom . |
| WO79/00870 | 11/1979 | WIPO . |
| WO87/00544 | 1/1987 | WIPO . |
| WO88/02048 | 3/1988 | WIPO . |

OTHER PUBLICATIONS

TAPPI Monograph Series No. 30, Paper Coating Pgments, pp. 34–35.

*Primary Examiner*—Peter A. Hruskoci
*Attorney, Agent, or Firm*—Klauber & Jackson

[57] ABSTRACT

There is disclosed a process for separating fine solids from water in the used water recovery system of a sheet forming mill, wherein the used water recovery system includes at least one stage in which an alkaline earth metal carbonate is precipitated in the aqueous suspension constituting the used water whereby the particulate material present in the used water becomes entrained in the alkaline earth metal carbonate precipitate. By the invention it is possible to recover the water and the fine solid materials which pass through the wire mesh belt of a paper or board forming machine, and optionally recycle those recovered materials.

18 Claims, 4 Drawing Sheets

RECOVERY OF WATER AND SOLIDS IN A PAPER MILL

CROSS-REFERENCE TO RELATED APPLICATION

This application is a continuation-in-part of pending application Ser. No. 08/171,018 filed Dec. 21, 1993.

This invention relates to an improved method for recovering the water and the fine solid materials which pass through the wire mesh belt of a paper or board forming machine.

Sheet cellulosic products, for example paper and board, are generally manufactured on machines of the type in which a dilute suspension of finely divided solid materials in water is spread evenly over the surface of a moving wire mesh belt, which is generally referred to in the art as the "wire", and water is drawn through the wire by gravity and by suction to leave a thin felt-like mat of the solid materials on the wire. When the web of sheet material formed in this way is partially dewatered it is transferred from the wire to a moving felt band which provides it with support while further dewatering is carried out.

The solid material used in the formation of paper and board products generally consists predominantly of fibres which are most commonly of cellulose, but which may contain a proportion of synthetic fibres. The fibrous material may be prepared, for example, by subjecting wood to a series of mechanical and/or chemical processes which separate the fibres substantially one from another and make them available for the sheet forming process in lengths ranging from about 10 μm to several millimeters. The solid material will often also include a particulate mineral material as a filler, the particles ranging in size from a fraction of a micrometer to about 50 μm.

In order to manufacture a sheet material of homogeneous composition and uniform thickness, it is generally necessary to apply the solid material to the wire of the paper machine in the form of a very dilute aqueous suspension containing from about 0.5% to 1.0% by weight of solid material. This means that a very large-quantity of water is required for the manufacture of paper and board; in fact the weight required is approximately two hundred times the weight of solid material used. It is therefore essential in most cases for environmental and economic reasons that as much as possible of the water which passes through the wire or is removed from the web of sheet material at a later stage is recovered for further use.

The water passing through the wire generally carries with it a substantial amount of fibrous or particulate material which is too fine to be retained by the mat of sheet material formed on the wire. This solid material is generally referred to as "fines", and may be organic or inorganic in nature. A useful definition of this term is given in the TAPPI Standard No. T 261 cm-90 "Fines fraction of paper stock by wet screening". This document describes a method for measuring the fines content of paper making stock or of pulp samples, and specifies that fines are those particles which will pass a round hole of diameter 76 μm. Generally up to about 50% by weight of the solid material in the aqueous suspension which is fed to the head box of the sheet forming machine passes through the wire, and must be recovered for re-use. From about 1% to about 5% by weight of the solid material which is fed to a paper or board making process is finally rejected. Of this material, about 5% by weight is rejected because it is too coarse to be incorporated, and the remainder consists of fines.

The water which passes through the wire is generally referred to as "white water" on account of its high content of fine solids which gives it a high turbidity. Almost all of this white water is recirculated to the plant in which the paper making stock is prepared in what is called the "primary circulation loop". However, not all the white water can be recirculated in this way because less water is carried away from the sheet material forming machine in the moist web than is introduced with the new solid material. The excess white water is withdrawn from the primary circulation loop and is processed in a secondary circulation loop which separates as completely as possible the solid materials from the suspending water, so that the solid material can either be re-used in the stock preparation process, or discharged as waste. The water which is then substantially free of suspended solids can then either be re-used in the sheet material forming plant, for example in sprays or "showers", or as pump sealing water, in various parts of the process, or may be discharged to a convenient natural water course.

The secondary circulation loop makes use of various pieces of apparatus which are known generically as "save-alls". These generally operate on one of three principles, namely sedimentation, or filtration or flotation. In the sedimentation type of save-all the white water flows very slowly through a large tank so that the solid material sinks to the bottom and substantially clear water overflows at the top. It is usually necessary to add a chemical coagulant to the white water so that the solid material is present in the form of clusters of particles, rather than as discrete particles. Also the sedimentation type of save- all is rarely adequate on its own, but needs to be used in conjunction with additional separation equipment. The filtration type of save-all is operated by passing the white water through a filter medium, which may conveniently be a fine wire mesh, which is generally pre-coated with a layer of fibres to improve filtration. Again it is usually necessary to add a chemical flocculant to improve the separation of the solid particles from the water. In the flotation save-all process, the white water is introduced into a vessel in which a rising stream of fine air bubbles is provided. Air is dissolved under pressure in the white water feed to the flotation save-all, and, when the pressure is reduced to the atmospheric level as the white water enters the flotation vessel, the solid particles act as nuclei onto which the air comes out of solution and forms bubbles. The solid particles with attached bubbles rise to the surface where they are skimmed off by rotating paddles. It is usually necessary to use two or more save-alls in series to achieve acceptable separation of solid material from the water.

According to the present invention, there is provided a process for separating fine solids from water in the used water recovery system of a sheet forming mill, wherein the used water recovery system includes at least one stage in which an alkaline earth metal carbonate is precipitated in the aqueous suspension constituting the used water whereby the particulate material present in the used water becomes entrained in the alkaline earth metal carbonate precipitate.

The particulate material present in the used water will generally consist predominantly of "fines", in other words that material which, according to TAPPI Standard No. T 261 cm-90, will pass through a round hole of diameter 76 μm.

The aqueous suspension constituting the used water will generally contain not more than about 5% by weight of particulate material, preferably not more than about 1% by weight of particulate material; such a dilute suspension of fine particles is difficult to separate into its solid and liquid components.

The suspension containing the precipitate of alkaline earth metal carbonate and entrained fine particulate material (or the separated filler itself) may be recycled to supplement the filler being used in the sheet forming process in the sheet forming mill. Alternatively, or in addition, the water separated from the suspension containing the precipitate of alkaline earth metal carbonate and entrained fine particulate material may be reused in the sheet forming mill.

In the process of the present invention, the alkaline earth metal carbonate precipitate may be formed by introducing into the suspension constituting the used water a source of alkaline earth metal ions and a source of carbonate ions. This will form the desired precipitate of alkaline earth metal carbonate in situ which will entrain the fine particles in the used water. The first reagent which is added is preferably uniformly distributed throughout the aqueous suspension to avoid local concentration gradients. When the first reagent is sparingly soluble, as is the case with calcium hydroxide, thorough mixing is desirable. It is also desirable that the suspension should be agitated while the second reagent is added in order to ensure an even distribution of the precipitate.

It is preferred to add the source of alkaline earth metal ions first followed by the source of carbonate ions. When the alkaline earth metal is calcium, this favours the precipitation of the scalenohedral form of calcium carbonate, which form appears to give the best light scattering properties when the aggregated product is to be re-used as a filler in the sheet forming process.

The source of alkaline earth metal ions is conveniently the alkaline earth metal hydroxide (known as milk of lime when the alkaline earth metal is calcium), but it may alternatively be a water-soluble alkaline earth metal salt, for example the chloride or nitrate. The alkaline earth metal hydroxide may be added already prepared to the aqueous suspension, or may be prepared in situ, for example by slaking an alkaline, earth metal oxide (e.g. quicklime when the alkaline earth metal is calcium) in the suspension.

The source of carbonate ions is conveniently carbon dioxide gas which is introduced into the suspension containing the source of alkaline earth metal ions. The carbon dioxide gas may be substantially pure as supplied in gas cylinders or may be present as a mixture of gases such as flue or exhaust gases from a lime kiln or power plant. Alternatively, the source of carbonate ions may be an alkali metal or ammonium carbonate. Sodium carbonate is especially preferred on account of its relative cheapness and availability.

Whether the alkaline earth metal oxide is slaked in used water or in fresh water, the water may be at ambient temperature, but is preferably heated to a temperature in the range of from 30° to 70° C., and the suspension of the alkaline earth metal oxide in the water is preferably agitated vigorously for a time of up to 30 minutes to ensure that the slaking is complete.

When the alkaline earth metal is calcium and the source of carbonate ions is a carbon dioxide containing gas, the production of calcium carbonate in the scalenohedral form is favoured by maintaining the temperature of the mixture of used water and calcium hydroxide in the range of from 20° to 65° C. The carbon dioxide containing gas preferably contains from 5% to 50% by volume of carbon dioxide, the remainder being conveniently air or nitrogen.

The quantity of the source of alkaline earth metal ions and of the source of carbonate ions used is preferably such as to precipitate sufficient alkaline earth metal carbonate to give a weight ratio of alkaline earth metal carbonate to fine particulate material in the range from 1:99 to 90:10, more preferably 10:90 to 90:10. The suspension containing the precipitate of alkaline earth metal carbonate and entrained fine particulate material may be recycled directly in its relatively dilute form to supplement the filler being used in the sheet forming process. Alternatively the suspension containing the precipitate may be dewatered by any conventional method, for example by sedimentation, by vacuum or pressure filtration, or in a centrifuge.

The suspension of the precipitate of alkaline earth metal carbonate and entrained fine particles is found to be very much easier to dewater than the original suspension of the fine particulate material alone, because, when a cake of the precipitate is formed by filtration or by centrifuging, the packing of the particles is such that the cake is very much more permeable to water than is a cake formed from the solid component of the used water alone. Also the precipitate, in many cases, is found to have advantageous light scattering properties which make it suitable for use as a filler in a paper or board making process. The precipitate may also find use as a filler, for example, in polymeric compositions such as carpet backing compositions.

The stage in which an alkaline earth metal carbonate is precipitated in the used water may conveniently replace either the first save-all stage or the second save-all stage of a conventional secondary circulation loop of a sheet forming process. Alternatively the alkaline earth metal carbonate precipitation stage may take as its feed suspension the solids fraction delivered by the second save-all stage.

According to another aspect off the present invention, there is provided a sheet cellulosic product, wherein at least a proportion of the inorganic filler is a mixed precipitate comprising an alkaline earth metal carbonate and fine solids separated from the used water recovery system of a sheet forming mill.

BRIEF DESCRIPTION OF THE DRAWINGS

The invention will now be illustrated, by way of example only, with reference to the accompanying drawings in which.

DETAILED DESCRIPTION OF THE DRAWINGS

Figure 1:
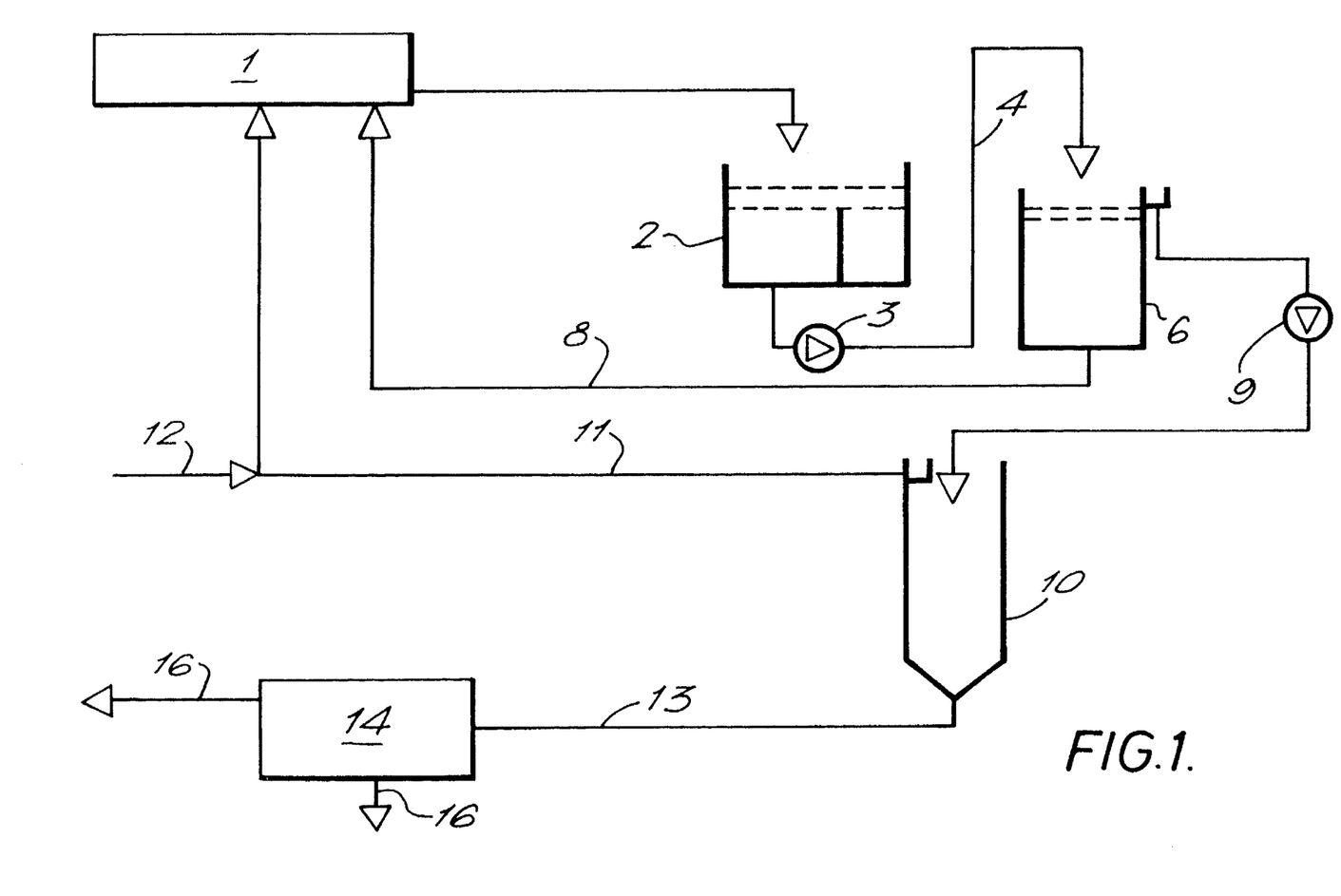
FIG. 1 is a flow diagram of a conventional secondary used water circulation system in a paper mill.

In FIG. 1, the reference numeral 1 represents the primary white water circulation system in a paper mill. An excess of used water passes through the wire of the paper making machine over that which can be returned as white water, and the excess used water overflows into a holding tank 2, whence it is transferred by means of a pump 3 and a conduits 4 to a first save-all 6, which may be, for example, of the sedimentation type. The solid particles which sink to the bottom of the save-all are returned in aqueous suspension through a conduit 8 to the primary circulation system. Water of reduced fine solids content overflows from the lip of the first save-all, but is insufficiently free of suspended solids to be used in the showers of the paper making process. This dilute suspension of fine particles is transferred by means of a pump 9 from the overflow lip of the first save-all to a second save-all 10, which may conveniently be of the type known as a clarifier which also operates on the sedimentation principle. Substantially clear water overflows from the second save-all and is returned through a conduit 11 to the primary circulation system. If required, clean water from the mains may be introduced through a conduit 12 to make up any deficiency in the quantity of water which is returned. A thickened sludge of fine particulate material is withdrawn from the base of the second save-all through a conduit 13 to an effluent treatment plant 14, in which the sludge is dewatered, for example by filtration, to give a cake of waste solid material which may be discharged at 15 to a suitable landfill site, and water of sufficiently good quality to be suitable for discharge through a conduit 16 to a natural water course.

Figure 2:
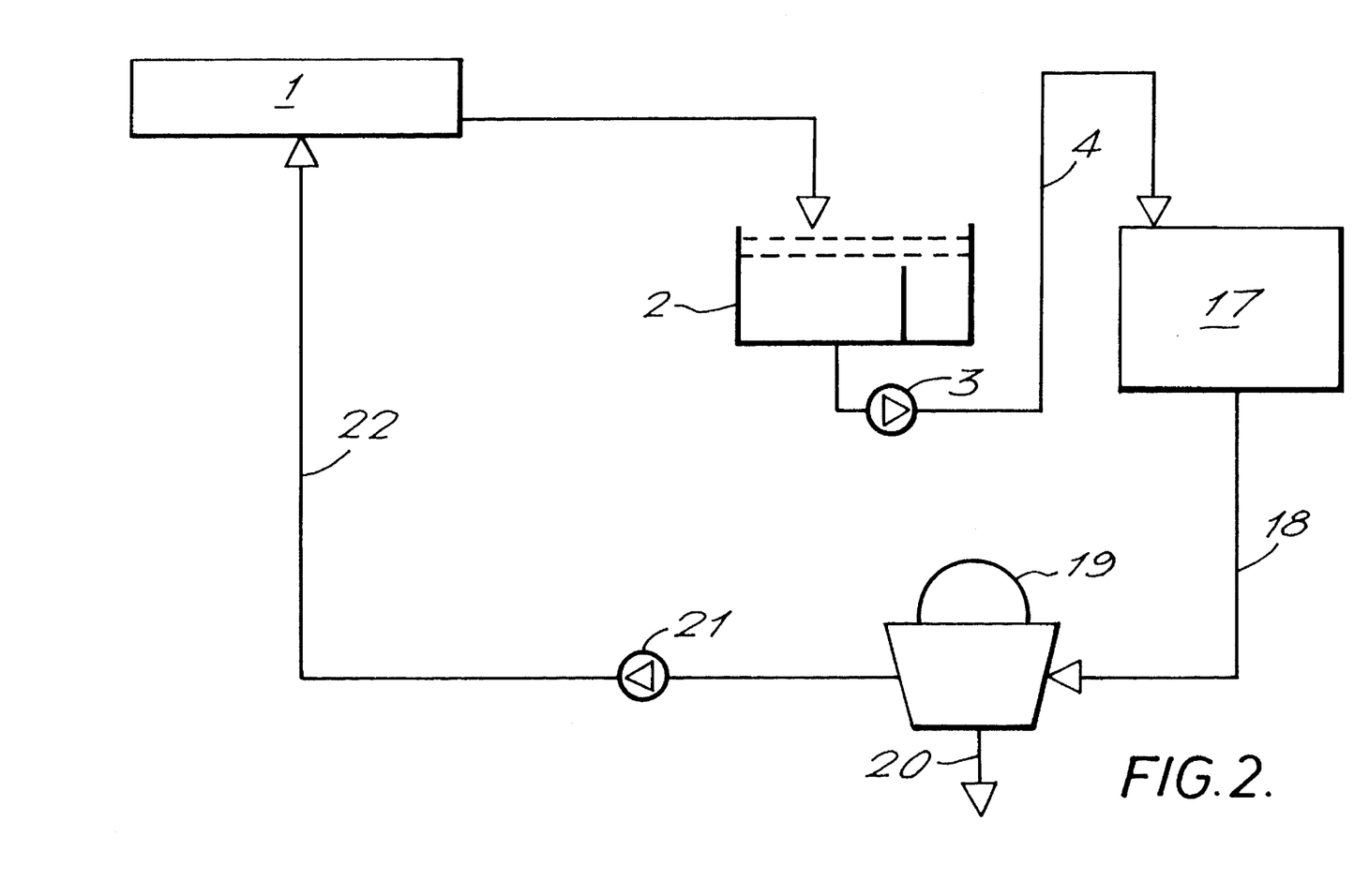
FIG. 2 is a flow diagram showing a first mode in which the process of the invention may be carried out.

FIG. 2 shows a secondary used water circulation system in which the first save-all is replaced with a plant 17 in which, in accordance with the invention, an alkaline earth metal carbonate is precipitated in the aqueous suspension constituting the used water whereby the particulate material present in the used water becomes entrained in the alkaline earth metal carbonate precipitate. The mixture of aggregated solid material and water which is the product of the plant 17 passes through a conduit 18 to a dewatering device 19, which may conveniently be a vacuum disc filter. A cake of the aggregated solid material is withdrawn at 20 and may be transported to the stock preparation plant of the paper mill for incorporation as a filler in the paper mill stock, or may be used for some other purpose. Substantially clear water is returned by means of a pump 21 through a conduit 22 to the primary circulation system.

Figure 3:
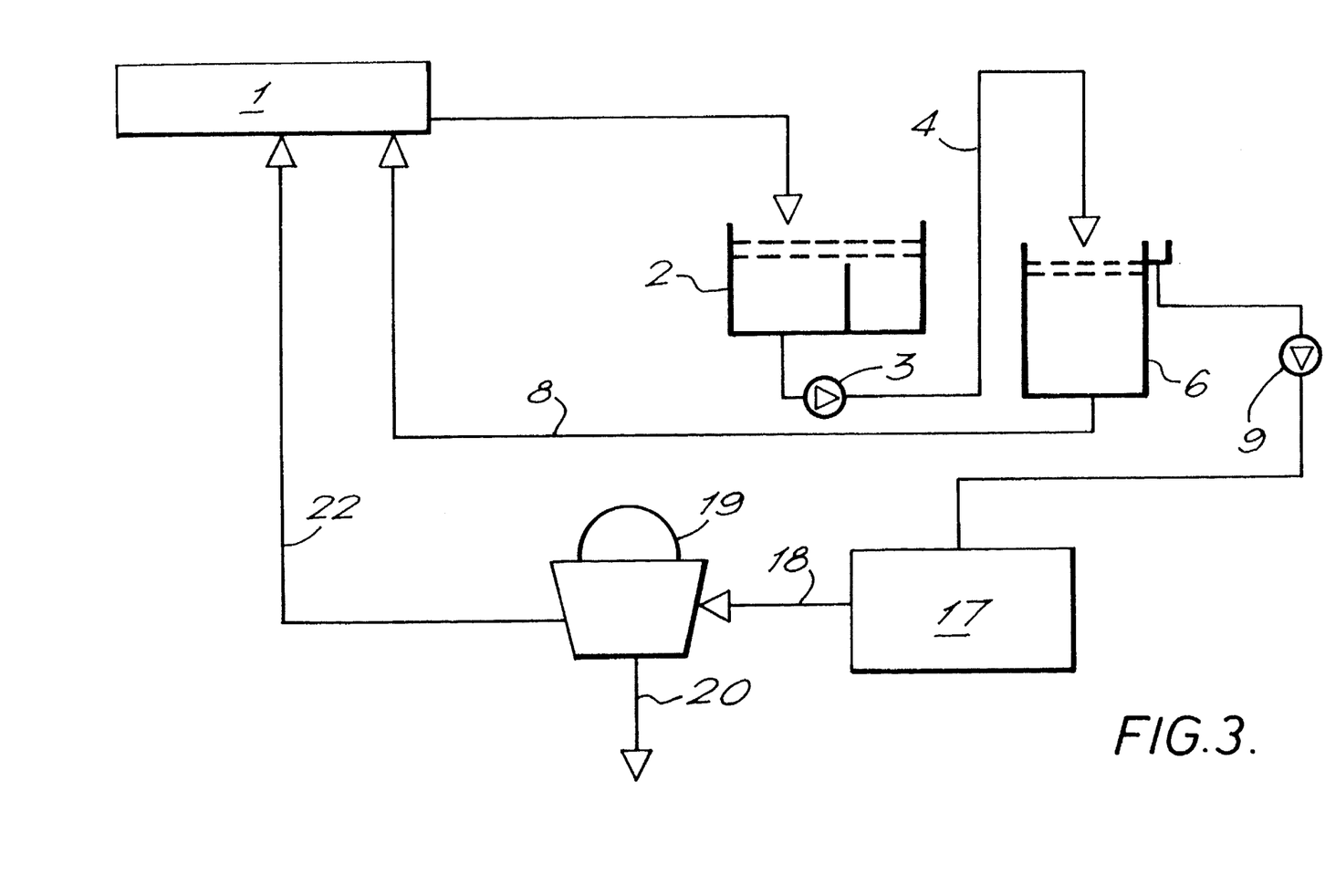
FIG. 3 is a flow diagram showing a second mode in which the process of the invention may be carried out.

FIG. 3 shows a secondary used water circulation system in which the second save-all is replaced with a plant 17 in which, in accordance with the invention, an alkaline earth metal carbonate is precipitated in the aqueous suspension constituting the used water. The mixture of aggregated solid material and water produced by the plant 17 passes through a conduit 18 to a vacuum disc filter 19. A cake of the aggregated solid material is formed and discharged at 20 for use as a filler in the paper mill stock, or for some other purpose. Substantially clear water is returned through a conduit 22 to the primary circulation system.

Figure 4:
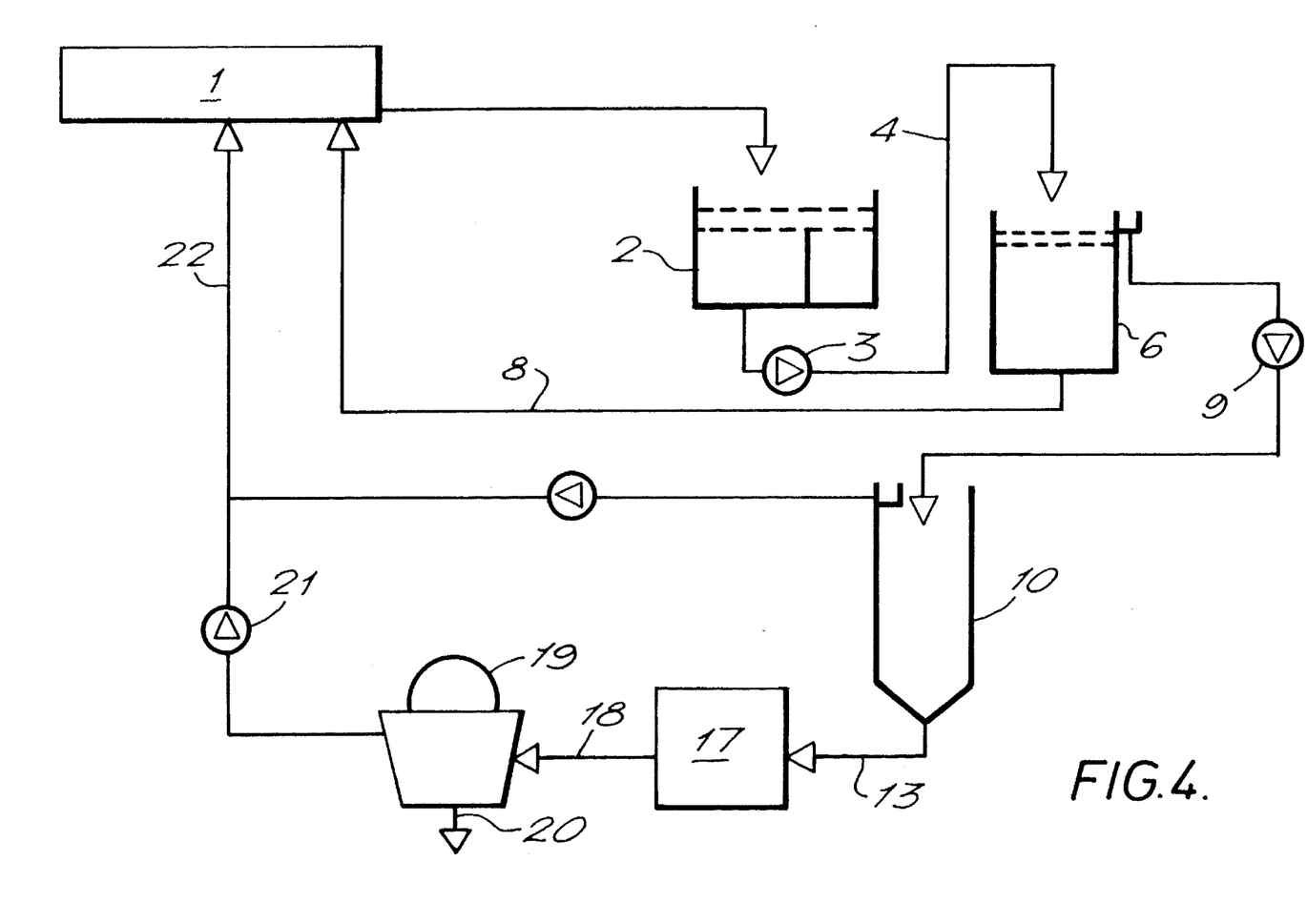
FIG. 4 is a flow diagram showing a third mode in which the process of the invention may be carried out.

FIG. 4 shows a secondary used water circulation system in which a plant 17 where, in accordance with the invention, an alkaline earth metal carbonate is precipitated in the aqueous suspension, is used to treat the solids sludge which is produced by the second save-all 10. The sludge passes to the plant 17 through a conduit 13, while substantially clear water is transferred by means of a pump 23 through a conduit 11 to the primary circulation system. The mixture of aggregated solid material and water produced by the plant 17 passes through a conduit 18 to a vacuum disc filter 19. A cake of the aggregated solid material is formed and discharged at 20 for use as a filler in the paper mill stock, or for some other purpose. Substantially clear water is returned by means of a pump 21 through a conduit 22 to the primary circulation system.

The invention is also illustrated by the following examples.

EXAMPLE 1

The used water entering the secondary circulation system of a paper mill was found to contain 0.27% by weight of suspended solids which were predominantly organic fines, but also contained a smaller proportion of inorganic filler particles. The first save-all of the secondary circulation system was replaced, in the manner shown in FIG. 2, with a plant in which the temperature of the used water was raised to 45° C., and there was added thereto 56 g of quicklime per liter of used water. The resultant mixture was vigorously stirred until the slaking of the quicklime was complete. A gas containing 25% by volume of carbon dioxide, the remainder being air, was then admitted into the mixture, the temperature of the mixture being maintained at 45° C., at a rate sufficient to convert all the calcium hydroxide present into calcium carbonate. An aggregated crystalline precipitate was formed, and a sample of the aqueous suspension of this product, which resulted from the carbonation of the mixture of used water and hydrated lime, was tested for filtration rate by the method described in Appendix 1 below and was found to give a result of 6.1 units. By comparison, the filtration rate of the used water entering the secondary circulation system was found to be 0.0176 units. The process in accordance with the invention was therefore found to increase the rate of filtration of the used water by a factor of nearly 350.

The suspension of the aggregated precipitate was dewatered by means of a vacuum disc filter and the water separated in this way was found to be crystal clear with no detectable turbidity. Also the cake of the aggregated crystalline material was dried and was examined under a scanning electron microscope. It was found to consist of fine scalenohedral precipitated calcium carbonate in conjunction with the particles and fibres which were originally present in the used water.

EXAMPLE 2

The used water entering the secondary circulation system of a paper mill was found to contain 0.3% by weight of fine solid material, 80% by weight of which consisted of organic fines, the remainder being fine calcium carbonate filler particles. The first save-all of the secondary circulation system was replaced, in the manner shown in FIG. 2, with a plant in which there was added to the used water at ambient temperature 134 ml of an aqueous suspension of hydrated lime (calcium hydroxide) per liter of used water. The suspension of hydrated lime was prepared by slaking 112 g of quicklime in 1 liter of water at 50° C. with vigorous agitation for 25 minutes. Assuming that the quicklime is completely slaked, each liter of the suspension prepared in this way will contain 148 g of calcium hydroxide. The weight of calcium hydroxide added per liter of used water was therefore 19.8 g. A gas containing 25% by volume of carbon dioxide, the remainder being air, was then admitted into the mixture, the temperature of the mixture being maintained at 45° C., at a rate sufficient to convert all the calcium hydroxide present into calcium carbonate. An aggregated crystalline precipitate was formed, and a sample of the aqueous suspension of this product, which resulted from the carbonation of the mixture of used water and hydrated lime, was tested for filtration rate by the method described in Appendix 1 below and was found to give a result of 2.43 units. By comparison, the filtration rate of the used water entering the secondary circulation system was found to be 0.0048 units. The process in accordance with the invention was therefore found to increase the rate of filtration of the used water by a factor of over 500.

The suspension of the aggregated precipitate was dewatered by means of a vacuum disc filter and the water separated in this way was found to be crystal clear with no detectable turbidity. Also the cake of the aggregated crystalline material was dried and was examined under a scanning electron microscope. It was found to consist of fine scalenohedral precipitated calcium carbonate in conjunction with the particles and fibres which were originally present in the used water. This aggregated material was found to be very suitable for incorporation into the paper making stock as a filler.

EXAMPLE 3

A sample of used water from the effluent treatment plant (14 in FIG. 1) of a paper mill in Kent, England making woodfree paper contained 2.3% by weight of fine solid material which consisted of 29% by weight of inorganic fines and 71% by weight of organic fines. The brightness of the solid material in the waste water was determined by filtering the water on a Whatman No.40 filter paper, drying the resultant cake in an oven, conditioning the dried cake for at least 15 hours at 23° C. and 50% relative humidity, and measuring the reflectance of the cake to light of wavelength 457 nm by the method prescribed in I.S.O. Standard No. 2470. The filtration rate of the waste water and the weight fraction of solids in the filter cake formed were determined by the method described in Appendix 1.

There was then added to the waste water at ambient temperature sufficient of a suspension containing 148 g of calcium hydroxide per liter to provide 17.0 g of calcium hydroxide per liter of waste water. This was the amount of calcium hydroxide which was calculated to give, after carbonation with carbon dioxide-containing gas, a weight of calcium carbonate per liter of waste water which was equal to the weight per liter of fine solid material. The suspension of calcium hydroxide was prepared as described in Example 2. A gas containing 20% by volume of carbon dioxide, the remainder being air, was then admitted into the mixture of waste water and calcium hydroxide, the temperature of the mixture being maintained at 50° C., at a rate sufficient to supply 0.048 moles of carbon dioxide per minute per mole of calcium hydroxide. The gas was passed through the mixture until the pH of the mixture fell to 7.0 which corresponded to a time of 21 minutes. An aggregated crystalline precipitate was formed, and samples of the aqueous suspension of this product, which resulted from the carbonation of the mixture of used water and calcium hydroxide, were tested for brightness of the solid material, filtration rate and the weight fraction of solids in the filter cake by the methods described above. The results are set forth in Table 1 below:

TABLE 1

| | Brightness of solid material | Filtration rate | wt. % solids in cake |
|---|---|---|---|
| Before treatment | 61.5 | 0.037 | 13.1 |
| After treatment | 83.0 | 1.030 | 46.5 |

The water separated from the aggregated precipitate by filtration was found to be crystal clear with no detectable turbidity.

Hand sheets of paper filled with the aggregated crystalline precipitate obtained as described above were prepared in the following way. 400 g of bleached sulphite spruce pulp were soaked in 10 liters of filtered water for 4 hours and the mixture was then disintegrated for 10 minutes in a turbine mixer, the impeller rotating at a speed of 1500 rpm. The contents of the mixer were washed out with a further 10 liters of water and transferred to a laboratory beater where a further 2 liters of water was added and the mixture beaten for 16.5 minutes. At this stage the stock contained approximately 1.8% by weight of dry pulp. The beating time was chosen to give the optimum compromise between brightness and strength properties of the stock which corresponds to a Canadian Standard Freeness of 300. 800 ml of the stock was then made up to 2 liters with water and disintegrated in a laboratory disintegrator which was operated for 15,000 revolutions of the impeller. The volume of stock was made up to 4 liters with filtered water and the consistency was checked by forming a paper sheet from a small sample by draining on a suitable wire screen and drying and weighing the sheet thus formed. Water was added if necessary to reduce the consistency to 0.3% by weight of dry pulp.

There was then added to the paper making stock thus formed and stirred in by hand sufficient of an aqueous suspension of the aggregated crystalline precipitate to provide 20% by weight of the total dry solid material in the paper making stock.

Hand sheets were prepared from the filler-containing paper making stock according to the procedure laid down in TAPPI Standard No. T205 om-88, "Forming handsheets for physical tests of pulp". For each hand sheet 400 ml of the stock was poured into the sheet forming machine and surplus water was removed.

The brightness, or percentage reflectance to violet light of the paper formed from each of the three portions of stock was measured by means of a DATACOLOR 2000 brightness meter fitted with a No. 8 filter (457 nm wavelength).

The opacity of each sample of paper was measured by means of the DATACOLOR 2000 brightness meter fitted with a No. 10 filter (a green filter embracing a broad spectrum of wavelengths). A measurement of the percentage of the incident light reflected was made with a stack of ten sheets of paper over the black cavity ($R_{oo}$). The ten sheets were then replaced with the single sheet from the top of the stack over the black cavity and a further measurement of the percentage reflectance was made (R). The percentage opacity was calculated from the formula:

Percentage opacity=$100.R/R_{oo}$

The procedure was performed a total of ten times with each time a different sheet of paper on the top of the stack, and the average value of the percentage opacity was determined.

The hand sheets from each batch were also tested for bursting strength by the test prescribed in TAPPI Standard No. T403 om- 85. The bursting strength is defined as the hydrostatic pressure in kilopascals required to produce rupture of the material when the pressure is increased at a controlled constant rate through a rubber diaphragm to a circular area of the paper 30.5 mm in diameter. The area of the material under test is initially flat and held rigidly at the circumference but is free to bulge during the test. Samples of each sheet were also weighed dry, the weight of the dry sample being used to determine the weight per unit area of the paper in grams per square meter. The burst strengths were divided by the weight per unit area of the paper to give a burst ratio.

As a comparison, the experiment described above was repeated, but using as the filler in the paper making composition 20% by weight of a precipitated calcium carbonate filler having a particle size distribution such that the weight median particle diameter was 3.0 µm.

As a further comparison, hand sheets were prepared from paper making stock which contained no filler and subjected to the same tests as are described above.

The results are set forth in Table 2 below. For the hand sheets prepared from stock containing filler, the burst ratio was expressed as a percentage of the value obtained for the unfilled hand sheets.

TABLE 2

|  | Brightness % | Opacity % | Burst ratio* |
| --- | --- | --- | --- |
| Unfilled | 83.4 | 72.0 | 100 |
| Precipitated calcium carbonate filler | 88.7 | 86.3 | 33 |
| Aggregated crystalline filler | 85.7 | 81.5 | 65 |

*% of value for unfilled sheet

These results show that although the brightness and opacity values achieved when the aggregated crystalline material is used as the filler are not as good as those obtained with the proprietary filler, they are still an improvement on those exhibited by the unfilled sheets. Also, the aggregated crystalline material causes a much smaller reduction in the strength of the paper than the proprietary filler.

EXAMPLE 4

The following samples of waste water were taken from different paper mills:

Sample A: from the overflow of the first save-all (6 on FIG. 1) of a paper mill in Scotland making woodfree paper. The waste water contained 0.37% by weight of fine solid material which consisted of 66% by weight of inorganic fines and 34% by weight of organic fines.

Sample B: from the coater effluent basin output of the coating plant of another paper mill in Scotland. The waste water contained 2.9% by weight of fine solid material which consisted of 86% by weight of inorganic fines and 14% by weight of organic fines. The fine solid material was in a deflocculated condition.

Sample C: from the feed to the effluent treatment plant (14 on FIG. 1) of a paper mill in Sweden making newsprint. The waste water contained 0.48% by weight fine solid material which consisted of 17% by weight of inorganic fines and 83% by weight of organic fines.

Sample D: from the feed to the effluent treatment plant (14 on FIG. 1) of another paper mill in Sweden making newsprint. The waste water contained 0.78% by weight of fine solid material which consisted of 41% by weight of inorganic fines and 59% by weight of organic fines.

There was added to each sample of waste water at ambient temperature sufficient of a suspension containing 148 g of calcium hydroxide per liter to provide, after carbonation with a carbon dioxide-containing gas, a weight of calcium carbonate equal to the weight of fine solid material in the sample. For example, in the case of Sample A, which contained 0.37% by weight of fine solid material, there was added sufficient of the calcium hydroxide suspension to provide 2.7 g of calcium hydroxide per liter of sample. A gas containing 20% by volume of carbon dioxide, the remainder being air, was then admitted into the mixture of waste water and calcium hydroxide, the temperature of the mixture being maintained at 50° C., at a rate sufficient, in the case of Sample A, to supply 0.11 moles of carbon dioxide per minute per mole of calcium hydroxide, and, in the case of Samples B–D, to supply 0.048 moles of carbon dioxide per minute per mole of calcium hydroxide. The gas was passed through the mixture until the pH of the mixture fell to 7.0 which corresponded to a time of 9 minutes in the case of Sample A, and about 20 minutes in the case of Samples B–D. An aggregated crystalline precipitate was formed, and samples of the aqueous suspension of this product, which resulted from the carbonation of the mixture of used water and calcium hydroxide, and samples of the waste water before the addition of the calcium hydroxide, were tested for brightness of the solid material, filtration rate and the weight fraction of solids in the filter cake by the methods described in Example 3 above. The turbidity of each sample of waste water before and after treatment with calcium hydroxide and carbon dioxide-containing gas was also determined. The results are set forth in Table 3 below:

TABLE 3

| Sample | Brightness of solid material | | Filtration rate | | % by weight solids in cake | | Turbidity | |
| --- | --- | --- | --- | --- | --- | --- | --- | --- |
|  | before | after | before | after | before | after | before | after |
| A | 76.7 | 87.1 | 0.003 | 0.440 | 32.4 | 34.0 | 1.9 | 0 |
| B | 66.9 | 86.7 | * | 0.830 | * | 45.4 | * | 1.5 |
| C | 34.3 | 54.4 | 0.004 | 0.310 | 42.9 | 36.3 | 76.5 | 19.6 |
| D | 33.4 | 49.4 | 0.007 | 0.480 | 39.0 | 39.0 | 100.0 | 20.4 |

Note: * indicates that the sample was deflocculated and therefore no meaningful measurement could be made.

In each case, the treatment in accordance with the invention effected a substantial improvement in the brightness of the solid material in suspension, the filtration rate and turbidity of the suspension. There was little change in the weight fraction of solids in the filter cake. In fact, in the case of sample C, there was a small decrease in the weight fraction of solids after the treatment.

Hand sheets were prepared by the procedure described in Example 3 above, using as the filler 20% by weight of the aggregated crystalline precipitate obtained by treating each of Samples A to D with calcium hydroxide and carbon dioxide-containing gas in accordance with the invention. The hand sheets were tested for brightness, opacity and burst ratio as described above.

As a comparison, hand sheets were also prepared using as the filler 20% by weight of a ground natural chalk filler having a particle size distribution such that 45% by weight consisted of particles having an equivalent spherical diameter smaller than 2 μm. The hand sheets were subjected to the same tests as described above.

As a further comparison, hand sheets were prepared from paper making stock which contained no filler and subjected to the same tests as are described above.

The results are set forth in Table 4 below:

TABLE 4

|  | Brightness % | Opacity % | Burst ratio* |
| --- | --- | --- | --- |
| Unfilled | 80.6 | 73.2 | 100 |
| Natural chalk filler | 80.6 | 82.0 | 47 |
| Sample A | 83.5 | 83.0 | 66 |
| Sample B | 84.1 | 85.0 | 48 |
| Sample C | 66.0 | 92.5 | 58 |
| Sample D | 59.0 | 94.0 | 63 |

*% of value for unfilled sheet

In each case the aggregated crystalline precipitate prepared in accordance with the invention gave hand sheets of superior opacity to those prepared using ground natural chalk as the filler. The crystalline precipitates prepared from Samples A and B gave sheets of superior brightness to those prepared using chalk as the filler, while the sheets prepared using the crystalline precipitates from Samples C and D were inferior. However, this was to be expected because Samples C and D were derived from waste water from mills producing newsprint rather than woodfree paper. In all cases the crystalline precipitates caused less reduction in the strength of the sheets than the natural chalk filler.

EXAMPLE 5

The aggregated crystalline precipitates which were formed by carbonating with carbon dioxide gas mixtures of used water Samples C and D with calcium hydroxide, as described in Example 4, were incorporated as fillers into laboratory hand sheets formed from a typical neutral mechanical pulp composition in the following manner.

400 g of a chemithermal mechanical softwood pulp was soaked in 10 liters of filtered water for 4 hours and the mixture was then disintegrated for 10 minutes in a turbine mixer, the impeller rotating at a speed of 1500 rpm. At this stage the stock contained approximately 3.8% by weight of dry pulp and the pH of the stock was approximately 7.0. 350 ml of this stock was then made up to 2 liters with filtered water and disintegrated in a British Standard laboratory disintegrator which was operated for 15,000 revolutions of the impeller. The volume of stock was made up to 4 liters with filtered water and the consistency was checked by forming a paper sheet from a small sample by draining on a suitable wire screen and drying and weighing the sheet thus formed. Water was added if necessary to reduce the consistency to 0.3% by weight of dry pulp. The Canadian Standard Freeness of the stock at this stage was in the range from 160 to 180.

There was then added to the paper making stock thus formed, and stirred in by hand, sufficient of an aqueous suspension of the aggregated crystalline precipitate to provide either 2% or 4% by weight of the total dry solid material in the paper making stock.

Hand sheets were prepared from the filler-containing paper making stock according to the procedure laid down in TAPPI Standard No. T205 om-88. For each hand sheet 400 ml of the stock was poured into the sheet forming machine and surplus water was removed.

The hand sheets were then conditioned for 16 hours at 23° C. and 50% relative humidity, and were then subjected to supercalendering in a laboratory supercalender for three passes at room temperature, at a speed of 25 m.min$^{-1}$ and at a force of 5 kN (15.4 kg per linear cm.).

The hand sheets were then tested for brightness, opacity and bursting strength by the procedures described in Example 3.

As a comparison, the experiment described above was repeated, but using as the filler in the neutral mechanical pulp composition 2% by weight of a calcined kaolin clay having a particle size distribution such that 91% by weight consisted of particles having an equivalent spherical diameter smaller than 2 µm. Mechanical pulps are commonly acidic in nature, and this calcined kaolin represents a high-cost, high performance filler which is suitable for use in such a composition.

As a further comparison, the experiment described above was repeated, but using as the filler in the neutral mechanical pulp composition 2% by weight of a precipitated calcium carbonate having a particle size distribution such that the weight median particle diameter was 3.0µm. This is an example of a high-performance filler which may be used in a mechanical pulp composition when the pH of the system is neutral or alkaline.

As a further comparison, hand sheets were prepared from paper making stock which contained no filler and subjected to the same tests as are described in Example 3.

The results are set forth in Table 5 below. For the hand sheets prepared from stock containing filler, the burst ratio was expressed as a percentage of the value obtained for the unfilled hand sheets.

TABLE 5

| Filler | Amount | Brightness % | Opacity % | Burst ratio* |
|---|---|---|---|---|
| Unfilled | | 55.4 | 87.6 | 100 |
| Calcined clay | 2% | 58.0 | 89.1 | 79 |
| Pptd. calcium carbonate | 2% | 56.2 | 88.3 | 68 |
| Sample C | 2% | 54.3 | 90.4 | 91 |
| Sample C | 4% | 54.5 | 91.1 | 83 |
| Sample D | 2% | 52.8 | 90.4 | 91 |
| Sample D | 4% | 52.0 | 90.9 | 85 |

*% of value for unfilled sheet

These results show that, although the brightness of the paper using as the filler the aggregated crystalline materials of the invention is generally poorer than that obtained with the conventional fillers, both the opacity and the strength of the resultant paper are improved when compared with the paper containing the conventional fillers.

Appendix 1

Filtration rate measurement method

A small sample of the suspension of the mixed mineral produced was poured into a Buchner filter funnel provided with a piece of standard filter paper, the side arm of the filtrate flask being connected to the laboratory vacuum source. The filtrate was collected in a measuring cylinder inside the filtrate flask, and at intervals the volume of filtrate collected and the time which had elapsed since the start of filtration were recorded. The square of the volume collected was plotted graphically against the elapsed time, and a curve was obtained which had a large central straight line portion. The slope of this straight line portion was recorded in each case.

The relationship between the square of the volume of filtrate collected and the elapsed time is given by the Carmen-Kozeny equation:

$$\frac{Q^2}{T} = \frac{2 \cdot A^2 \cdot P \cdot E^3 \cdot (v-1)}{5 \cdot v \cdot S^2 \cdot (1-E)^2 \cdot d^2}$$

where:
Q is the volume of filtrate collected;
T is the elapsed filtration time;
A is the area of the filter medium;
P is the differential pressure across the filter medium;
E is the fraction of voidage in the filter cake;
v is the viscosity of the suspending medium;
S is the specific surface area of the particulate phase; and
d is the specific gravity of the particulate phase.

The slope $Q^2/T$ of the straight line portion of the graph plotted for each suspension gives a measure of the filtration rate in each case and, since A, P, v, S and d can be assumed to be constant under the conditions of the experiment, a standardised filtration rate F can be found to be given by:

$$F = \frac{Q^2 \cdot R}{T}$$

where:

$$R = \frac{\frac{1}{d} + \frac{W_c}{S_c}}{\frac{W_s}{S_s} - \frac{W_c}{S_c}}$$

where:
$W_c$ is the weight fraction of water in the cake;
$S_c$ is the weight fraction of solids in the cake;
$W_s$ is the weight fraction of water in the suspension; and
$S_s$ is the weight fraction of solids in the suspension.

We claim:

1. A process for separating fine particulate material from water in the used water recovery system of a sheet forming mill, comprising the following steps: (a) precipitating calcium carbonate in an aqueous suspension constituting said used water to entrain the fine particulate material present in said used water in the calcium carbonate precipitate to form a mixed aggregated crystalline precipitate including scalenohedral calcium carbonate; (b) dewatering the suspension resulting from step (a) to separate the mixed precipitate in the form of a cake from the aqueous suspension by filtering or centrifuging; and (c) recovering the mixed precipitate.

2. A process according to claim 1, wherein the aqueous suspension constituting the used water contains not more than about 5% by weight of particulate material.

3. A process according to claim 1, wherein the aqueous suspension constituting the used water contains not more than about 1% by weight of particulate material.

4. A process according to claim 1, wherein the calcium carbonate precipitate is formed by introducing into the suspension constituting the used water a source of calcium ions and a source of carbonate ions.

5. A process according to claim 4, wherein the source of calcium ions is added to the aqueous suspension first followed by the source of carbonate ions.

6. A process according to claim 4, wherein the source of calcium ions is calcium hydroxide or a water-soluble calcium salt.

7. A process according to claim 6, wherein the source of calcium ions is calcium hydroxide which is added ready prepared to the aqueous suspension.

8. A process according to claim 6, wherein the source of calcium ions is calcium hydroxide which is prepared in situ.

9. A process according to claim 4, wherein the source of carbonate ions is carbon dioxide gas which is introduced into the suspension containing the source of calcium ions.

10. A process according to claim 9, wherein the source of calcium ions is calcium hydroxide and the source of carbonate ions is a carbon dioxide containing gas, wherein the production of calcium carbonate in the scalenohedral form occurs by maintaining the temperature of the mixture of used water and calcium hydroxide in the range of from 20° to 65° C.

11. A process according to claim 9, wherein the carbon dioxide containing gas contains from 5% to 50% by volume of carbon dioxide.

12. A process according to claim 4, wherein the source of carbonate ions is an alkali metal or ammonium carbonate.

13. A process according to claim 4, wherein the quantity of the source of calcium ions and of the source of carbonate ions used is such as to precipitate sufficient calcium carbonate to give a weight ratio of calcium carbonate to fine particulate material in the range of 1:99 to 90:10.

14. A process according to claim 1, wherein the aqueous suspension resulting from step (a) is recycled to supplement a filler being used in a sheet forming process being carried out in said sheet forming mill.

15. A process according to claim 1, wherein the precipitate of calcium carbonate and entrained fine particulate material is separated from the aqueous suspension resulting from step (a) and are recycled to a sheet forming process being carried out in said sheet forming mill.

16. A process according to claim 1, wherein water separated from the suspension containing the precipitate of calcium carbonate and entrained fine particulate material is reused in the sheet forming mill.

17. A process for enhancing the filtration rate of used water comprising an aqueous suspension of a fine particulate material present in a used water recovery system of a sheet forming mill comprising the following steps: (a) precipitating calcium carbonate in an aqueous suspension constituting said used water to entrain the fine particulate material present in said used water in the calcium carbonate precipitate to form a mixed crystalline precipitate including scalenohedral calcium carbonate; filtering the suspension resulting from step (a) to separate the mixed precipitate in the form of a cake from the aqueous suspension; and (c) recovering the mixed precipitate.

18. A process for treating the used water comprising an aqueous suspension of a fine particulate material in a used water recovery system of a sheet forming mill comprising the following steps: (a) precipitating calcium carbonate in an aqueous suspension constituting said used water to entrain the fine particulate material present in said used water in the calcium carbonate precipitate to form a mixed crystalline precipitate including scalionhedral calcium carbonate; (b) dewatering the suspension resulting from step (a) to separate the mixed precipitate in the form of a cake from the aqueous suspension by filtering or centrifuging; and (c) recovering the mixed precipitate; wherein said calcium carbonate is formed by first introducing into said aqueous suspension a source of calcium carbonate ions obtained from compounds selected from the group consisting of calcium hydroxide and water-soluble calcium salts, and subsequently introducing carbon dioxide gas into said aqueous suspension containing said calcium ions.

* * * * *